United States Patent
Heimpel

(10) Patent No.: US 9,615,431 B2
(45) Date of Patent: Apr. 4, 2017

(54) LIGHTING APPARATUS FOR A MOTOR VEHICLE HAVING A DAYTIME RUNNING LIGHT ILLUMINATED AT DIFFERENT LEVELS

(71) Applicant: Dr. Ing. h.c. F. Porsche Aktiengesellschaft, Stuttgart (DE)

(72) Inventor: Peter Heimpel, Tiefenbronn/Muehlhausen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/006,136

(22) Filed: Jan. 26, 2016

(65) Prior Publication Data
US 2016/0242261 A1    Aug. 18, 2016

(30) Foreign Application Priority Data
Feb. 16, 2015   (DE) .......................... 10 2015 102 178

(51) Int. Cl.
| | |
|---|---|
| *B60Q 1/14* | (2006.01) |
| *H05B 37/02* | (2006.01) |
| *B60Q 1/28* | (2006.01) |
| *B60Q 1/26* | (2006.01) |

(52) U.S. Cl.
CPC ....... *H05B 37/0227* (2013.01); *B60Q 1/2603* (2013.01); *B60Q 1/28* (2013.01); *H05B 37/0218* (2013.01); *B60Q 2400/30* (2013.01)

(58) Field of Classification Search
CPC ........................... B60Q 1/143; B60Q 2400/30
USPC ....................... 315/77, 82; 362/487; 340/937
See application file for complete search history.

(56) References Cited

U.S. PATENT DOCUMENTS

| | | | |
|---|---|---|---|
| 5,081,565 A * | 1/1992 | Nabha .................. | B60Q 1/1423 307/10.8 |
| 6,254,259 B1 | 7/2001 | Kobayashi | |
| 6,262,537 B1 * | 7/2001 | Matsumoto ............ | B60Q 1/143 307/10.8 |
| 9,187,026 B2 * | 11/2015 | Kurebayashi ............ | B60Q 1/04 |

(Continued)

FOREIGN PATENT DOCUMENTS

| | | |
|---|---|---|
| DE | 10328214 A1 | 2/2005 |
| DE | 102011081432 A1 | 2/2013 |

*Primary Examiner* — Thuy Vinh Tran
(74) *Attorney, Agent, or Firm* — Leydig, Voit & Mayer, Ltd.

(57) ABSTRACT

A lighting apparatus for a motor vehicle includes a daytime running light device, a low-beam, high-beam, or low- and high-beam light device, and a drive device operable to drive an illumination level of the daytime running light device. With the low-beam and/or high-beam light device switched off, the drive device drives the daytime running light device so as to have a first illumination level. With the low-beam and/or high beam light device switched on, the drive device drives the daytime running light device so as to have a second illumination level. With the low-beam and/or high-beam light device switched on and with poor weather conditions, the drive device drives the daytime running light device so as to have a third illumination level. The second illumination level is less than or equal to the first illumination level. The third illumination level is less than the second illumination level.

11 Claims, 1 Drawing Sheet

(56) References Cited

U.S. PATENT DOCUMENTS

2006/0044818 A1* 3/2006 Amagasa ............... B60Q 1/28
362/514
2014/0198213 A1* 7/2014 Liken .................. B60Q 1/1423
348/148
2014/0333201 A1 11/2014 Foltin

* cited by examiner

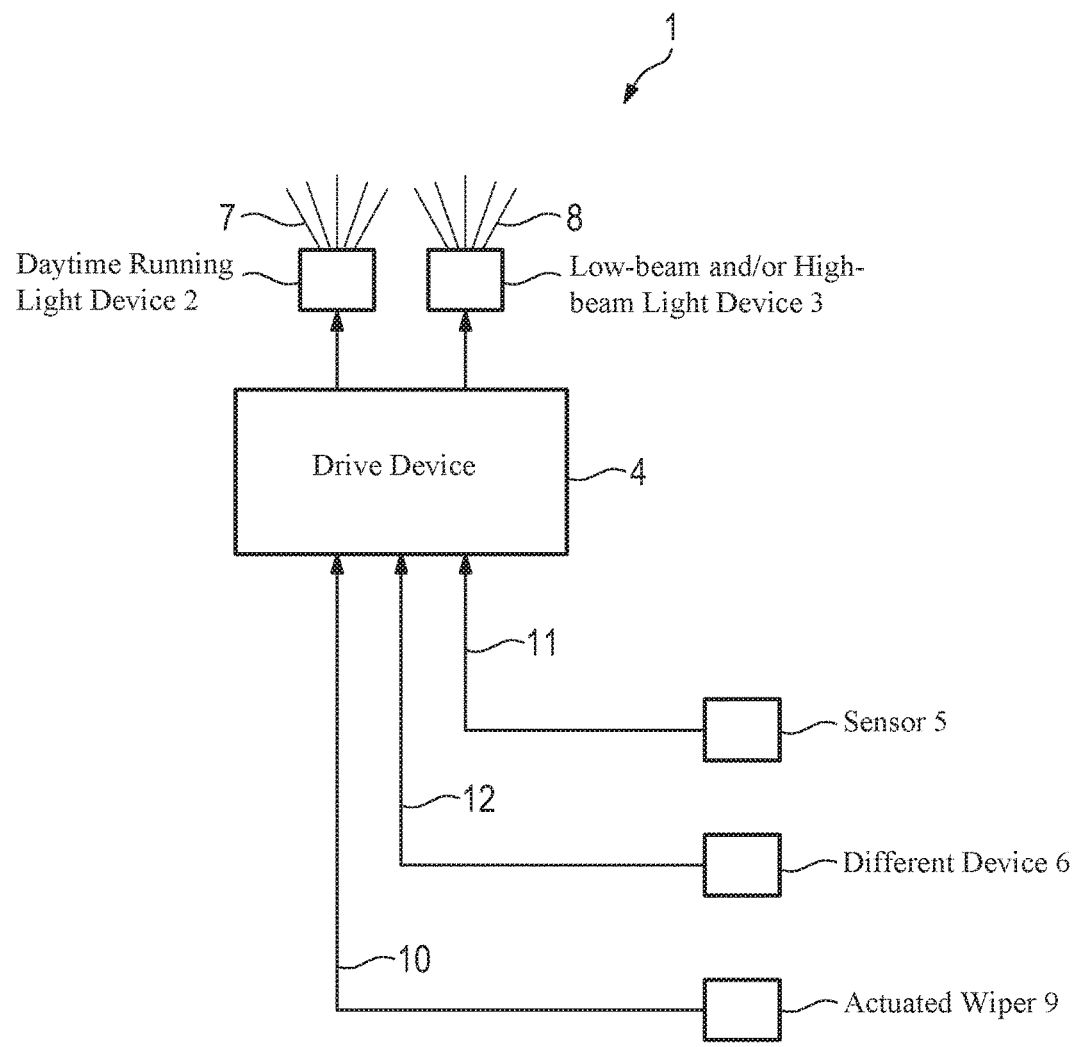

LIGHTING APPARATUS FOR A MOTOR VEHICLE HAVING A DAYTIME RUNNING LIGHT ILLUMINATED AT DIFFERENT LEVELS

CROSS REFERENCE TO RELATED APPLICATIONS

Priority is claimed to German Patent Application No. DE 10 2015 102 178.1, filed on Feb. 16, 2015, the entire disclosure of which is hereby incorporated by reference herein.

FIELD

The invention relates to a lighting apparatus for a motor vehicle comprising a daytime running light device and comprising a low-beam and/or high-beam light device, wherein a drive device is furthermore provided, by means of which the luminous level of the daytime running light device is drivable. Moreover, the invention relates to a method in respect thereof.

BACKGROUND

Such lighting apparatuses have been disclosed in the prior art, for example by DE 103 28 214 A1. In that case, said document discloses a lighting apparatus for a motor vehicle in which a low-beam and/or high-beam light and a daytime running light device are provided, which are driven by a drive device, wherein with the low-beam and/or high-beam light switched on, the illumination level of the daytime running light is reduced in such a way that it is still usable as a position luminaire. However, the daytime running light in this operating state is darkened or at a low illumination level such that the recognition of the vehicle or of the light design of the daytime running light is only low.

Moreover, it is known, with the low-beam and/or high-beam light switched on, for the daytime running light to be switched off, that is to say for the illumination level to be reduced to zero.

With the low-beam and/or high-beam light switched off, the daytime running light is switched on and usually switched to a maximum illumination level, such that the motor vehicle is readily identifiable even during the day. In this case, the daytime running light also constitutes a brand-typical identification mark on the basis of which the brand association of the vehicle is readily identifiable.

However, this identifiability is not provided or is not provided well in darkness and with the daytime running light switched off or when the daytime running light is driven as position identifier. On the other hand, if the daytime running light is driven to a high illumination level in darkness, too, then disturbing light reflections occur particularly under poor weather conditions.

SUMMARY

In an embodiment, the present invention provides a lighting apparatus for a motor vehicle including a daytime running light device, a low-beam and/or high-beam light device, and a drive device operable to drive an illumination level of the daytime running light device. With the low-beam and/or high-beam light device switched off, the drive device drives the daytime running light device so as to have a first illumination level. With the low-beam and/or high beam light device switched on, the drive device drives the daytime running light device so as to have a second illumination level. With the low-beam and/or high-beam light device switched on and with poor weather conditions, the drive device drives the daytime running light device so as to have a third illumination level. The second illumination level is less than or equal to the first illumination level. The third illumination level is less than the second illumination level.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

The FIGURE shows a schematic illustration of a lighting apparatus according to an embodiment of the invention.

DETAILED DESCRIPTION

An aspect of the present invention is to provide a lighting apparatus which allows a good identification of the brand association and avoids disturbing light reflections particularly in darkness and under poor weather conditions. Moreover, another aspect of the invention is to provide a method in this respect.

One exemplary embodiment of the invention relates to a lighting apparatus for a motor vehicle comprising a daytime running light device and comprising a low-beam and/or high-beam light device, wherein a drive device is furthermore provided, by means of which the illumination level of the daytime running light device is drivable, wherein, with the low-beam and/or high-beam light device switched off, the daytime running light device is driven in such a way that the illumination level of the daytime running light is at a first illumination level, and with the low-beam and/or high-beam light device switched on, the daytime running light device is driven in such a way that the illumination level of the daytime running light is at a second illumination level, and, with the low-beam and/or high-beam light device switched on and with poor weather conditions, the daytime running light device is driven in such a way that the illumination level of the daytime running light is at a third illumination level, wherein the second illumination level is less than or equal to the first illumination level and wherein the third illumination level is less than the second illumination level. What is achieved thereby is that with low-beam light and/or high-beam light the daytime running light is utilized further as part of the low-beam light and/or of the high-beam light, although if appropriate with a reduced illumination level, wherein the daytime running light is dimmed or switched off under poor weather conditions which can lead to disturbing stray light. In this regard, firstly, the night design of the vehicle can be improved and, secondly, disturbances can be avoided or reduced under poor weather conditions.

It is particularly advantageous if the second illumination level is less than the first illumination level. In this regard, with low-beam light and/or high-beam light, the night design can be maintained, this being carried out with a reduced illumination level of the daytime running light device.

Moreover, it is advantageous if the third illumination level is less than the second illumination level but different than zero. As a result, even under poor weather conditions, a night design is still realized which allows the brand association of the vehicle to be identified, for example.

Alternatively, however, it may also be advantageous if the third illumination level is zero. The possibly disturbing light reflections on account of the daytime running light are prevented as a result.

Moreover, it is advantageous if the drive device generates or receives a signal which signals a poor weather condition, wherein a poor weather condition is assessed as present when the signal is present. As a result, the drive device itself can identify whether a poor weather condition is present or a different device can identify this and transfer the signal to the drive device.

It is particularly advantageous if the signal of an actuated wiper and/or of an actuated rear fog lamp and/or of an actuated fog lamp signals a poor weather condition and the drive device is designed to receive such a signal. As a result, automated or driver-actuated elements can identify that a poor weather condition is present. If it is raining, the wiper is actuated in an automated manner or manually. This usually also applies in the case of snowfall and/or in the case of fog. In the case of the fog lamp or a rear fog lamp being switched on, the presence of fog can be deduced, which is also regarded as a poor weather condition.

Moreover, it is expedient if a sensor is provided, which identifies rain, snowfall or fog or comparable weather conditions and generates a signal which signals a poor weather condition and the drive device is designed so as to receive such a signal. The current weather condition can be determined independently as a result.

In this regard, it is advantageous if the sensor is an optical sensor, such as a camera-based sensor, in particular. Said sensor can directly identify the weather and output a corresponding signal.

Furthermore, it is also advantageous if a different device present in the motor vehicle generates a signal if it identifies a poor weather condition. This can be, for example, an automatic wiper device, etc.

The FIGURE shows a lighting apparatus 1 for a motor vehicle. Said lighting apparatus 1 comprises a daytime running light device 2 for generating a daytime running light 7. Furthermore, the lighting apparatus 1 comprises a low-beam and/or high-beam light device 3, for generating a low-beam and/or high-beam light 8. Furthermore, a drive device 4 is provided, for driving the illumination level of the daytime running light 7 or of the daytime running light device 2. In this case, the drive device 4 can also drive the illumination level of the low-beam and/or high-beam light device 3 or of the low-beam light and/or of the high-beam light 8.

With the low-beam and/or high-beam light device 3 switched off, the daytime running light device 2 is driven in such a way that the illumination level of the daytime running light 7 is at a first illumination level.

With the low-beam and/or high-beam light device 3 switched on, the daytime running light device 2 is driven in such a way that the illumination level of the daytime running light 7 is at a second illumination level.

With the low-beam and/or high-beam light device 3 switched on and with poor weather conditions, the daytime running light device 2 is driven in such a way that the illumination level of the daytime running light 7 is at a third illumination level.

In this case, it is advantageous if the second illumination level is less than or equal to the first illumination level. In this regard, in daylight and in darkness with good weather conditions, the illumination level can be kept high for identifying the light design of the daytime running light.

In this case, provision is furthermore made for the third illumination level to be less than the second illumination level. This has the effect that, with poor weather conditions and with the low-beam and/or high-beam light switched on, the stray light is reduced.

In this regard, provision can already be made for the second illumination level to be less than the first illumination level with the low-beam and/or high-beam light switched on.

If the weather conditions are poor, then it may be advantageous if the third illumination level is less than the second illumination level but different than zero. In this regard, the daytime running light can be reduced in this operating situation in such a way that it is not disturbing, but is nevertheless identifiable. Alternatively, the daytime running light 7 can also be driven in such a way that the third illumination level is zero. This maximally reduces the disturbing light reflections.

In the case of the present invention, it is of importance that poor weather conditions are identifiable. In this case, the drive device 4 is embodied in such a way that it generates or receives a signal which signals a poor weather condition, wherein a poor weather condition is assessed as present when the signal is present. The illumination level of the daytime running light 7 or of the daytime running light device 2 is driven accordingly.

In accordance with one exemplary embodiment of the invention, the signal 10 of an actuated wiper 9 and/or of an actuated rear fog lamp and/or of an actuated fog lamp is utilized which signals a poor weather condition, wherein the drive device 4 is designed so as to receive such a signal.

Alternatively or additionally, a sensor 5 can be provided, which identifies rain, snowfall or fog or comparable weather conditions and generates a signal 11 which signals a poor weather condition and the drive device 4 is designed so as to receive such a signal 11.

In this case, it is particularly advantageous if the sensor 5 is an optical sensor, such as a camera-based sensor, in particular. Said sensor, by means of image evaluation, can result in poor weather being identified.

Alternatively or additionally, a different device 6 present in the motor vehicle can generate a signal 12 if it identifies a poor weather condition.

The method according to the invention provides a method for operating a lighting apparatus 1 according to which the respective illumination level of the daytime running light is driven depending on what conditions are present.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A lighting apparatus for a motor vehicle comprising:
   a daytime running light device;
   a light beam device; and
   a drive device operable to drive an illumination level of the daytime running light device, wherein:
      the drive device is operable to drive the daytime running light device so as to have a first illumination level with the light beam device switched off,
      the drive device is operable to drive the daytime running light device so as to have a second illumination level with the light beam device switched on and,
      the drive device is operable to drive the daytime running light device so as to have a third illumination level with the light beam device switched on with poor weather conditions,
   wherein light beam device is a low-beam device, a high-beam device, or a low- and high-beam device,
   wherein the second illumination level is less than or equal to the first illumination level, and
   wherein the third illumination level is less than the second illumination level.

2. The lighting apparatus as recited in claim 1, wherein the second illumination level is less than the first illumination level.

3. The lighting apparatus as recited in claim 1, wherein the third illumination level is different than zero.

4. The lighting apparatus as recited in claim 1, wherein the third illumination level is zero.

5. The lighting apparatus as recited in claim 1, wherein the drive device is configured to generate or receive a signal that signals a poor weather condition and to assess a poor weather condition as present when the signal is present.

6. The lighting apparatus as recited in claim 5, wherein the signal that signals the poor weather condition is a signal of at least one of an actuated wiper, an actuated rear fog lamp, and an actuated fog lamp.

7. The lighting apparatus as recited in claim 5, wherein the drive device is configured to receive a signal from a sensor which identifies rain, snowfall, fog or comparable weather conditions and to generate the signal that signals a poor weather condition.

8. The lighting apparatus as recited in claim 7, wherein the sensor is an optical sensor.

9. The lighting apparatus as recited in claim 8, wherein the optical sensor is a camera-based sensor.

10. The lighting apparatus as recited in claim 5, wherein the drive device receives the signal that signals the poor weather condition from a different device present in the motor vehicle that generates the signal if it identities a poor weather condition.

11. A method for operating a lighting apparatus, the method comprising:
   driving an illumination level of a daytime running light device using a drive device so as to:
      drive the daytime running light device at a first illumination level when a light beam device is switched off,
      drive the daytime running light device at a second illumination level when the light beam device is switched on, and
      drive the daytime running light device at a third illumination level when the light beam device is switched on and there are poor weather conditions,
   wherein light beam device is a low-beam device, a high-beam device, or a low- and high-beam device,
   wherein, the second illumination level is less than or equal to the first illumination level, and
   wherein the third illumination level is less than the second illumination level.

* * * * *